United States Patent
Lee et al.

(10) Patent No.: US 9,354,604 B2
(45) Date of Patent: May 31, 2016

(54) OPTICALLY ADDRESSABLE SPATIAL LIGHT MODULATOR DIVIDED INTO PLURALITY OF SEGMENTS, AND HOLOGRAPHIC THREE-DIMENSIONAL IMAGE DISPLAY APPARATUS AND METHOD USING THE LIGHT MODULATOR

(71) Applicants: SAMSUNG ELECTRONICS CO., LTD., Suwon-si (KR); CAMBRIDGE ENTERPRISE LIMITED, Cambridge (GB)

(72) Inventors: Hong-seok Lee, Seongnam-si (KR); Neil Collings, Linton (GB); Daping Chu, Cambridge (GB); Hoon Song, Yongin-si (KR); William Alden Crossland, Harlow (GB); Jhen Si Chen, Cambridge (GB)

(73) Assignees: SAMSUNG ELECTRONICS CO., LTD., Suwon-si (KR); CAMBRIDGE ENTERPRISE LIMITED, Cambridge (GB)

( * ) Notice: Subject to any disclaimer, the term of this patent is extended or adjusted under 35 U.S.C. 154(b) by 331 days.

(21) Appl. No.: 13/858,256

(22) Filed: Apr. 8, 2013

(65) Prior Publication Data
US 2014/0104664 A1     Apr. 17, 2014

(30) Foreign Application Priority Data
Oct. 16, 2012 (KR) .................... 10-2012-0115028

(51) Int. Cl.
*G03H 1/08* (2006.01)
*G03H 1/12* (2006.01)
(Continued)

(52) U.S. Cl.
CPC ............. *G03H 1/0808* (2013.01); *G02F 1/00* (2013.01); *G02F 1/135* (2013.01); *G03H 1/2294* (2013.01); *G03H 2210/30* (2013.01);
(Continued)

(58) Field of Classification Search
CPC ............. G03H 1/2294; G03H 1/0005; G03H 2001/0224; G03H 1/0841; G03H 2001/0212; G03H 2225/25; G03H 2226/02; G03H 1/10; G03H 2210/22; G03H 2001/0421; G03H 2210/40; G03H 2210/44; G03H 2225/30; G02F 2203/12; G02F 1/0018
USPC ............................. 359/9, 10, 11, 21, 32, 35
See application file for complete search history.

(56) References Cited

U.S. PATENT DOCUMENTS

| | | |
|---|---|---|
| 7,009,741 B2 | 3/2006 | Payne |
| 8,111,445 B2 | 2/2012 | Chui et al. |

(Continued)

*Primary Examiner* — Jade R Chwasz
(74) *Attorney, Agent, or Firm* — Sughrue Mion, PLLC (57) ABSTRACT

Provided are an optically addressable spatial light modulator (OASLM) divided into a plurality of segments, and an apparatus and method for displaying a holographic three-dimensional (3D) image using the OASLM. The holographic 3D image display apparatus includes a first light source which emits a write beam, an electric addressable spatial light modulator (EASLM) which modulates the write beam emitted from the first light source according to hologram information regarding a 3D image, a second light source which emits a read beam, an OASLM which receives the write beam modulated by the EASLM and modulates the read beam emitted from the second light source according to hologram information included in the modulated write beam, a scanning optical unit which projects the write beam modulated by the EASLM onto the OASLM, and a Fourier lens which focuses the read beam modulated by the OASLM onto a predetermined space to form the 3D image.

9 Claims, 4 Drawing Sheets

(51) Int. Cl.
*G03H 1/04* (2006.01)
*G02F 1/00* (2006.01)
*G02F 1/135* (2006.01)
*G03H 1/22* (2006.01)

(52) U.S. Cl.
CPC ....... *G03H 2222/36* (2013.01); *G03H 2225/25* (2013.01); *G03H 2225/32* (2013.01); *G03H 2240/41* (2013.01)

(56) References Cited

U.S. PATENT DOCUMENTS

| | | |
|---|---|---|
| 8,130,185 B2 | 3/2012 | Handschy et al. |
| 2005/0083559 A1* | 4/2005 | Horikoshi ............... G03H 1/02 359/3 |
| 2007/0188858 A1 | 8/2007 | Slinger |
| 2008/0204853 A1* | 8/2008 | Hughes et al. ............... 359/290 |

* cited by examiner

OPTICALLY ADDRESSABLE SPATIAL LIGHT MODULATOR DIVIDED INTO PLURALITY OF SEGMENTS, AND HOLOGRAPHIC THREE-DIMENSIONAL IMAGE DISPLAY APPARATUS AND METHOD USING THE LIGHT MODULATOR

CROSS-REFERENCE TO RELATED APPLICATION

This application claims priority from Korean Patent Application No. 10-2012-0115028, filed on Oct. 16, 2012, in the Korean Intellectual Property Office, the disclosure of which is incorporated herein in its entirety by reference.

BACKGROUND

1. Field

Apparatuses and methods consistent with exemplary embodiments relate to an optically addressable spatial light modulator (OASLM) divided into a plurality of segments, and a holographic three-dimensional (3D) image display apparatus and method using the OASLM.

2. Description of the Related Art

Recently, in various fields such as the fields of entertainment, gaming advertising, medical imaging, education, military affairs, etc., a three-dimensional (3D) image display apparatus capable of representing an image in a realistic and effective way is desired. Consequently, various techniques for displaying a 3D image have been proposed, and various 3D image display apparatuses have already been commercialized. Currently commercialized 3D image display apparatuses use binocular parallax between a viewer's eyes, in which a left-eye view image and a right-eye view image, which have different points of view, are provided to the left eye and the right eye, respectively, allowing a viewer to perceive a 3D effect. Examples of the 3D image display apparatus include a glasses-type 3D image display apparatus which requires the use of special glasses and a non-glasses-type 3D image display apparatus which requires no glasses.

However, in the case of a stereoscopy type device using binocular parallax, a viewer may feel much eye fatigue and a change of a viewpoint due to a viewer's movement cannot be addressed because only two viewpoints of the left-eye view image and the right-eye view image are provided. Therefore, there are limitations to the ability to provide a natural stereoscopic effect. To display a stereoscopic image naturally by remedying this limitation, a holographic 3D image display technique has been studied.

A holographic 3D image display apparatus uses a principle that once a reference beam is irradiated onto a hologram having recorded thereon an interference pattern obtained by interference between a laser beam that is reflected from an original object and a reference beam, then the reference beam is diffracted and an image of the original object is reproduced. A currently commercialized holographic 3D image display apparatus provides a computer-generated hologram (CGH), rather than a hologram obtained by directly exposing the original object to light, as an electric signal to a spatial light modulator. The spatial light modulator diffracts the reference beam according to the input CGH signal, thus generating a 3D image.

In such a holographic apparatus, to allow a reproduced 3D image to have a sufficient resolution and viewing angle (that is, a large space bandwidth product), the performance of the spatial light modulator is important. For example, a spatial light modulator having about $10^{10}$ pixels in an area of about 100 $cm^2$ is used. A generally used electrically addressable spatial light modulator (EASLM) is configured such that a drive circuit and an interconnection are disposed for each pixel. Consequently, there is a limitation in terms of reduction of the pixel size, such that the foregoing resolution requirement is difficult to meet. Thus, a holographic 3D image display apparatus using an optically addressable spatial light modulator (OASLM) has been proposed. The OASLM includes a photosensitive layer disposed on an incident plane of a write beam such that only pixels in a region in which the write beam is incident may be selectively turned on. The OASLM does not need a separate drive circuit or interconnection, and thus may satisfy the foregoing resolution requirement.

To generate a high-resolution CGH necessary for reproduction of a high-resolution 3D image, a large amount of computation is required. Therefore, to reduce the amount of computation required for CGH generation, various CGH generation methods and optimization methods have been suggested. One of them is an active tiling scheme of dividing the OASLM into a plurality of small tiles, generating a CGH for a relatively-low-resolution image corresponding to each tile, and sequentially providing the generated CGHs to the respective tiles.

SUMMARY

One or more exemplary embodiments provide an optically addressable spatial light modulator (OASLM) divided into a plurality of segments having small gaps therebetween, and a holographic three-dimensional (3D) image display apparatus using the OASLM. One or more exemplary embodiments also provide a holographic 3D image display method using the OASLM.

Additional exemplary aspects and advantages will be set forth in part in the description which follows and, in part, will be apparent from the description, or may be learned by practice of the presented exemplary embodiments.

According to an aspect of an exemplary embodiment, an optically addressable spatial light modulator (OASLM) includes a plurality of divided light modulation segments arranged in a two-dimensional (2D) array, gaps formed between the plurality of segments, and one of a plurality of independent transparent electrodes and one of a plurality of independent interconnections assigned to each of the plurality of segments, such that the plurality of segments can be turned on/off independently of one another.

The OASLM may further include a front substrate and a rear substrate which are transparent and which face each other, and the plurality of transparent electrodes may include a plurality of first transparent electrodes disposed on a surface of the front substrate and a plurality of second transparent electrodes disposed on a surface of the rear substrate.

The OASLM may further include a photosensitive layer disposed on the first transparent electrodes and a liquid crystal layer disposed on the second transparent electrodes.

According to an aspect of an exemplary embodiment, the first transparent electrodes, the second transparent electrodes, the photosensitive layer, and the liquid crystal layer may be patterned to form the plurality of divided segments.

According to an aspect of an exemplary embodiment, the plurality of interconnections may include a plurality of first interconnections which are disposed on the front substrate and are electrically connected to the first transparent electrodes corresponding thereto, and a plurality of second interconnections which are disposed on the rear substrate and are electrically connected to the second transparent electrodes corresponding thereto.

For example, the plurality of first interconnections and the plurality of second interconnections may be arranged along the gaps between the plurality of segments.

According to an aspect of an exemplary embodiment, the OASLM may further include a first half portion and a second half portion divided with respect to a center of the OASLM, the plurality of first interconnections and the plurality of second interconnections are disposed in a distributed manner over the first half portion and the second half portion, and the plurality of first interconnections and the plurality of second interconnections disposed in the first half portion are connected to the plurality of first transparent electrodes and the plurality of second transparent electrodes disposed in the first half portion, and the plurality of first interconnections and the plurality of second interconnections disposed in the second half portion are connected to the plurality of first transparent electrodes and the plurality of second transparent electrodes disposed in the second half portion.

According to an aspect of an exemplary embodiment, the plurality of interconnections may include a plurality of first interconnections which are disposed along an outer surface of the front substrate and which face a region of the plurality of first transparent electrodes and are electrically connected to the plurality of first transparent electrodes corresponding thereto, and a plurality of second interconnections which are disposed along an outer surface of the rear substrate and which face a region of the plurality of second transparent electrodes and are electrically connected to the plurality of second transparent electrodes corresponding thereto.

In this case, the OASLM may further include a first via hole passing through the front substrate, wherein the plurality of first interconnections are electrically connected with the plurality of first transparent electrodes corresponding thereto via the first via hole and a second via hole passing through the rear substrate, wherein the plurality of second interconnections are electrically connected with the plurality of second transparent electrodes corresponding thereto via the second via hole.

According to an aspect of another exemplary embodiment, a holographic three-dimensional (3D) image display apparatus includes a first light source for emitting a write beam, an electric addressable spatial light modulator (EASLM) for modulating the write beam emitted from the first light source according to hologram information regarding a 3D image, a second light source for emitting a read beam, an optically addressable spatial light modulator (OASLM) having the above-described structure, and a scanning optical unit for projecting the write beam modulated by the EASLM onto the OASLM.

The holographic 3D image display apparatus may further include a Fourier lens for focusing the read beam modulated by the OASLM.

According to an aspect of an exemplary embodiment, the EASLM may be configured to sequentially modulate the write beam according to hologram information spatially divided into a plurality of regions corresponding to the plurality of segments of the OASLM, and the scanning optical unit may be configured to sequentially project the sequentially modulated write beams onto the plurality of corresponding segments of the OASLM.

The scanning optical unit may be configured to project the modulated write beam onto only a region of each segment, less than the segment as a whole.

According to an aspect of another exemplary embodiment, a holographic three-dimensional (3D) image display method includes generating a hologram regarding a complete 3D image to be finally displayed, dividing the hologram into a plurality of sub-holograms corresponding to a plurality of segments of an optically addressable spatial light modulator (OASLM), and discarding a region of the hologram corresponding to gaps between the plurality of segments, optimizing the plurality of sub-holograms, sequentially providing the optimized sub-holograms to an electric addressable spatial light modulator (EASLM) to modulate a write beam, sequentially projecting the modulated write beams to segments of the OASLM corresponding to the respective sub-holograms to modulate a read beam, and projecting the read beam modulated by the OASLM to generate the 3D image.

The OASLM may be the OASLM having the above-described structure.

For example, the hologram may be a computer-generated hologram (CGH), and the generating of the hologram may include generating the hologram by using one of a ping-pong algorithm, a coherent ray trace method, and a diffraction-specific algorithm.

The plurality of sub-holograms may be divided in the same two-dimensional (2D) array as the plurality of segments.

According to an aspect of another exemplary embodiment, the optimizing of the plurality of sub-holograms may include binarizing the plurality of sub-holograms with respect to amplitude or phase according to modulation characteristics of the OASLM.

For example, the optimizing of the plurality of sub-holograms may include optimizing the plurality of sub-holograms by using one of an iterative algorithm, a projection onto constrained sets (POCS) algorithm, and a direct binary search (DBS) algorithm.

According to an aspect of another exemplary embodiment, the modulated write beam may be projected onto only a region of each segment of the OASLM, less than the segment as a whole.

According to an aspect of another exemplary embodiment, during projection of a write beam modulated based on an optimized sub-hologram onto a segment corresponding to the sub-hologram, a sub-hologram corresponding to a next segment following the segment may be optimized.

A segment to which the write beam is incident from among the plurality of segments of the OASLM may be turned on and the other segments may be turned off.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Hereinafter, with reference to the accompanying drawings, an optically addressable spatial light modulator (OASLM) divided into a plurality of segments, and a holographic three-dimensional (3D) image display apparatus and method using the OASLM will be described in detail. Like reference numerals refer to like elements throughout, and in the drawings, sizes of elements may be exaggerated for clarity and convenience of explanation. The embodiments described below are merely exemplary, and various modifications may be possible from the embodiments. In a layer structure described below, an expression "above" or "on" may include not only "immediately on in a contact manner" but also "on in a non-contact manner". As used herein, the term "and/or" includes any and all combinations of one or more of the associated listed items.

Figure 1:
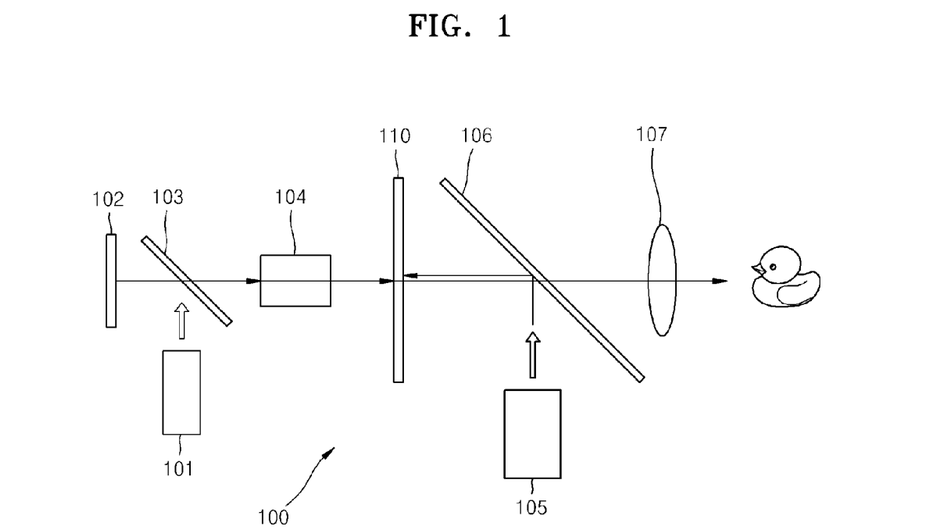
FIG. 1 is a conceptual diagram schematically showing a structure of a holographic three-dimensional (3D) image display apparatus according to an exemplary embodiment.

FIG. 1 is a conceptual diagram schematically showing a holographic 3D image display apparatus according to an exemplary embodiment.

Referring to FIG. 1, a holographic 3D image display apparatus 100 may include a first light source 101 for emitting a write beam, an electric addressable spatial light modulator (EASLM) 102 for modulating the write beam emitted from the first light source 101 according to hologram information (e.g., a computer-generated hologram (CGH) signal)) spatially divided into a plurality of regions, a second light source 105 for emitting a read beam, an optically addressable spatial light modulator (OASLM) 110 including a plurality of segments which receive the write beam modulated by the EASLM 102 and modulate the read beam emitted from the second light source 105 according to the hologram information included in the modulated write beam, and a scanning optical unit 104 for transmitting the write beam modulated by the EASLM 102 to corresponding positions among the plurality of segments of the OASLM 110. The holographic 3D image display apparatus 100 may further include a Fourier lens 107 for focusing the read beam modulated by the OASLM 110 onto a predetermined space. When the EASLM 102 is of a reflective type, the holographic 3D image display apparatus 100 may further include a beam splitter 103 for reflecting the write beam emitted from the first light source 101 to the EASLM 102 and passing the write beam modulated by the EASLM 102 therethrough. Likewise, when the OASLM 110 is of a reflective type, the holographic 3D image display apparatus 100 may further include a beam splitter 106 for reflecting the read beam emitted from the second light source 105 to the OASLM 110 and passing the read beam modulated by the OASLM 110 therethrough.

The first light source 101 may use a laser which emits, for example, coherent light, but may be a general light source which emits light having no coherency. To improve the resolution of the OASLM 110, the first light source 101 may emit light having a short wavelength. For example, a green light source or an ultraviolet light source in an i-line band may be used as the first light source 101. The second light source 105 may emit, for example, light having a red wavelength longer than that of light emitted from the first light source 101, but this is merely an example and a wavelength of the light emitted from the second light source 105 is not particularly limited.

The EASLM 102 modulates the write beam irradiated from the first light source 101 according to the hologram information, and may include, for example, one of a digital micro-minor device (DMD), a liquid crystal on silicon (LCoS), and a liquid crystal display (LCD). The hologram information provided to the EASLM 102 may be a CGH, and hologram information spatially divided into a plurality of regions corresponding to a plurality of segments divided in the OASLM 110 may be sequentially provided to the EASLM 102.

Figure 2:
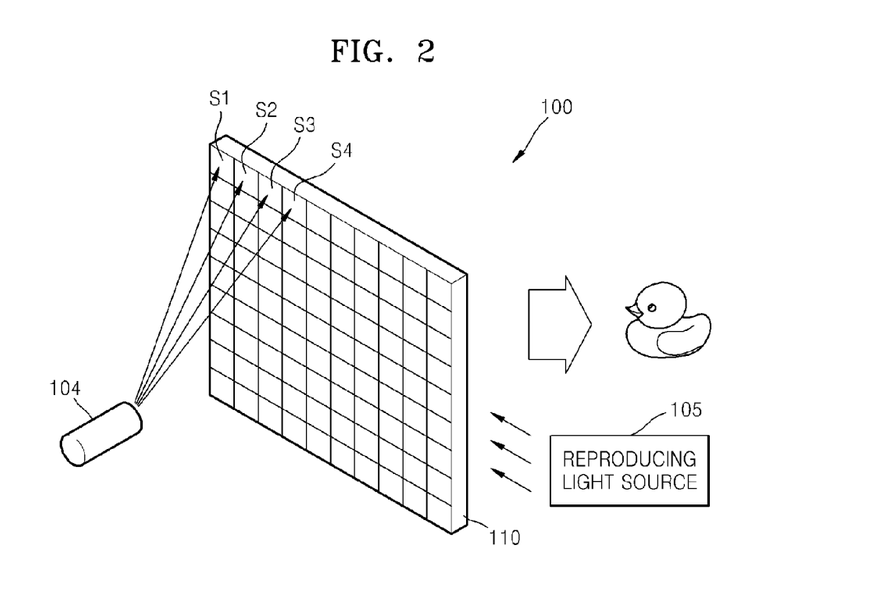
FIG. 2 is a schematic perspective view for describing an operation of a holographic 3D image display apparatus shown in FIG. 1.

FIG. 2 is a perspective view for describing an operation of the holographic 3D image display apparatus 100 shown in FIG. 1. For convenience, in FIG. 2, only the scanning optical unit 104 and the OASLM 110 are shown, and other components are omitted.

Referring to FIG. 2, the OASLM 110 is divided into a plurality of segments for modulating the write beam. The plurality of segments may be arranged in an N×M two-dimensional (2D) array, in which N and M are natural numbers greater than 1. Each segment may include pixels having a small width of about 1 μm. As mentioned previously, hologram information (e.g., a CGH signal) spatially divided into the plurality of regions corresponding to the plurality of segments may be sequentially provided to the EASLM 102. For example, hologram information corresponding to a first segment region S1, a second segment region S2, a third segment region S3, and a fourth segment region S4, respectively, may be sequentially provided to the EASLM 102, and the EASLM 102 may sequentially modulate the write beam according to the provided hologram information.

The scanning optical unit 104 delivers the write beam, having been sequentially modulated by the EASLM 102, to a corresponding segment on the OASLM 110. For example, the scanning optical unit 104 provides the write beam modulated according to the hologram information corresponding to the first segment region S1 of the EASLM 102 to the first segment region S1 of the OASLM 110, and then provides the write beam modulated according to the hologram information corresponding to the second segment region S2 of the EASLM 102 to the second segment region S2 of the OASLM 110. In this way, the scanning optical unit 104 sequentially scans the write beam from the first segment to the last segment of the OASLM 110. In this way, all hologram information regarding a 3D image of a frame may be provided to the OASLM 110. The OASLM 110 modulates the read beam emitted from the second light source 105 based on the hologram information included in the write beam incident on each segment. The modulated read beam is reflected by the OASLM 110 and is projected onto a predetermined space, such that a 3D image of a frame may be formed. The modulated read beam may be focused by the Fourier lens 107 to form a 3D image at a focal point of the Fourier lens 107.

When the hologram information is a CGH, as described previously, the amount of computation necessary for generating and optimizing a CGH increases as the resolution of a 3D image increases and the viewing angle of the 3D image increases. In the current embodiment, considering that there are gaps between segments of the OASLM 110, the amount of computation necessary for optimizing a CGH may be reduced. That is, although indicated by simple lines in FIG. 2, gaps incapable of modulating a read beam exist between the segments of the OASLM 110. As a result, even if the write beam including the hologram information is incident to the gap, a hologram portion corresponding to the gap may not contribute to modulation of the read beam. Therefore, by optimizing regions of a CGH corresponding to the segments of the OASLM 110 while ignoring regions of the CGH corresponding to the gaps, the amount of computation necessary for optimizing the CGH may be reduced. For example, an area of the gaps with respect to the entire area of the OASLM 110 may be about 1%, such that according to the current embodiment, the amount of computation necessary for generating optimized hologram information may be reduced by about 1%.

According to the current embodiment, the optimized hologram information may be generated as below. First, hologram information, such as a CGH, for a complete 3D image to be finally displayed by the holographic 3D image display apparatus 100 is generated using a computer based on an optical theory. The generated CGH includes information about intensity and phase of waves as a coherence pattern projected onto a 2D plane having the same aspect ratio as the OASLM 110. Various schemes for effectively generating a CGH which accurately reflects a 3D image have been disclosed. For example, a CGH may be generated using methods such as a ping-pong algorithm, a coherent ray trace method, a diffraction-specific algorithm, etc.

Thereafter, the generated CGH for the complete image is divided into a plurality of sub-CGHs corresponding to the plurality of segments of the OASLM 110. For example, referring to FIG. 3, in a CGH 10 for the complete image, regions corresponding to the plurality of segments of the OASLM 110 are taken and divided into a plurality of sub-CGHs 11, and a region 12 corresponding to gaps between the segments is discarded. Therefore, the plurality of sub-CGHs 11 may be arranged in an N×M 2D array like the plurality of segments of the OASLM 110.

Figure 3:
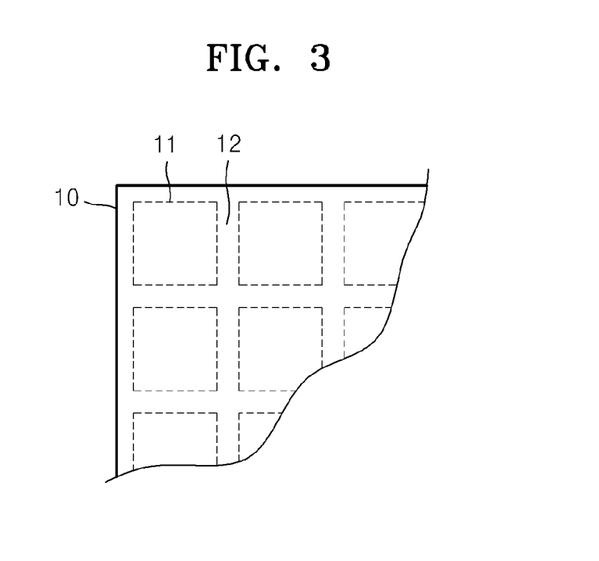
FIG. 3 schematically shows an example in which a computer-generated hologram (CGH) for a complete image is divided into a plurality of sub-CGHs corresponding to a plurality of segment regions.

The plurality of sub-CGHs 11 are sequentially provided to the EASLM 102 and thus may be used for modulation of the write beam in a predetermined pattern. Thereafter, the write beam modulated based on a particular sub-CGH 11 may be projected onto the segment of the OASLM 110 corresponding to that particular sub-CGH 11 through the scanning optical unit 104. However, prior to execution of such an operation, optimization may be performed with respect to the plurality of sub-CGHs 11. The optimization is a process for matching an actual 3D image finally formed through the OASLM 110 (or the OASLM 110 and the Fourier lens 107) with an intended image. Through the optimization, an error occurring in the generation of the CGH 10 for the complete image is corrected, a loss of information occurring in the division of the CGH 10 into the plurality of sub-CGHs 11 is compensated for, and an error caused by modulation characteristics of the EASLM 102 and the OASLM 110 is compensated for. By using the optimized sub-CGH 11, even if the sub-CGHs 11 do not include information regarding a region corresponding to gaps between the segments of the OASLM 110, the complete image may be reproduced.

In particular, if the OASLM 110 is not a modulator capable of performing both phase modulation and amplitude modulation, the optimization may be important. As described before, the hologram information in the CGH 10 includes information about intensity and phase of light. Therefore, to form an accurate 3D image, it is advantageous for the OASLM 110 to perform both phase modulation and amplitude modulation. However, it may be more practical to use a phase modulator capable of performing only phase modulation or an amplitude modulator capable of performing only amplitude modulation than to use a modulator capable of performing both phase modulation and amplitude modulation. An error generated due to the use of an amplitude modulator or a phase modulator may be compensated for by the optimization. By performing the optimization, a binary amplitude modulator which modulates the intensity of the read beam into a 'bright' or 'dark' state or a binary phase modulator which modulates the phase of the read beam into '0°' or '180°' may be used.

Various algorithms for carrying out the optimization have been disclosed. For example, by using methods such as an iterative algorithm, a projection onto constrained sets (POCS) algorithm, a direct binary search (DBS) algorithm, etc., the optimization may be performed with respect to the plurality of sub-CGHs 11. When the OASLM 110 is a binary amplitude modulator or a binary phase modulator, the sub-CGHs 11 may be binarized in terms of amplitude or phase by using one of the foregoing algorithms. According to the current embodiment, assuming that an area of gaps with respect to the total area of the OASLM 110 is about 1%, the amount of computation necessary for the optimization may be reduced by about 1% because the sub-CGHs 11 do not include a region corresponding to the gaps.

Figure 4:
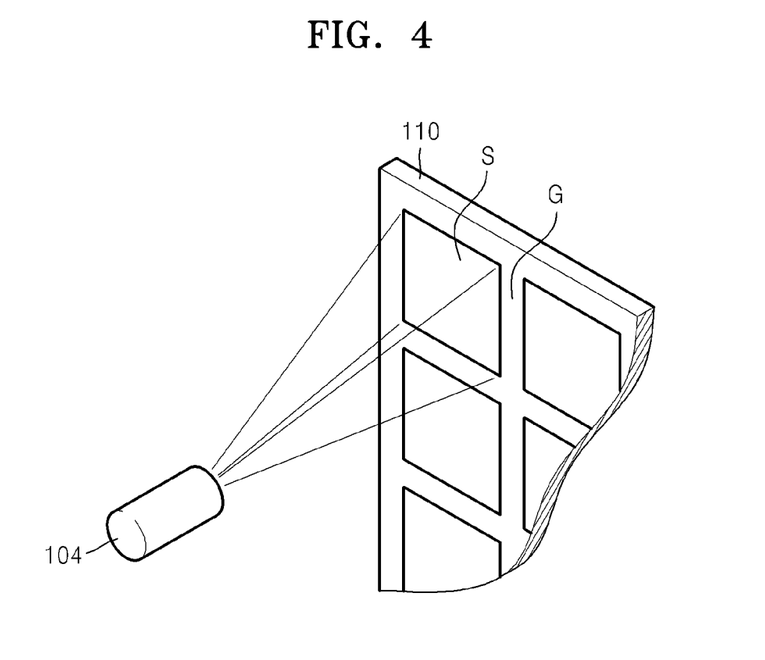
FIG. 4 is a perspective view schematically showing an example in which a modulated write beam is projected to a segment of an optically addressable spatial light modulator (OASLM) through a scanning optical unit.

The sub-CGHs 11 optimized in the foregoing manner are sequentially provided to the EASLM 102 to be used for modulation of the write beam in a predetermined pattern. Thereafter, the write beam sequentially modulated based on the optimized sub-CGHs 11 may be sequentially projected onto the segments of the OASLM 110 corresponding to the respective sub-CGHs 11 through the scanning optical unit 104. As shown in FIG. 4, the scanning optical unit 104 accurately projects the modulated write beam onto a corresponding segment S of the OASLM 110. That is, the scanning optical unit 104 may be configured to project the modulated write beam onto only a region of the particular segment S and not to project the modulated write beam onto a gap G surrounding the segment S. This is because the modulated write beam includes hologram information of only a region corresponding to the corresponding segment S and does not include hologram information of a region corresponding to the gap G.

According to the current embodiment, the optimization of the sub-CGHs 11 and the projection of the modulated write beam may be performed at the same time. For example, during projection of the write beam modulated based on the particular optimized sub-CGH 11 onto the segment corresponding to that particular sub-CGH 11, the optimization may be performed with respect to the sub-CGH 11 corresponding to the next segment following the corresponding segment. In this case, a time for displaying a 3D image may be reduced when compared to a case where the write beam is modulated and projected after optimization of all the sub-CGHs 11.

In this way, the scanning optical unit 104 may sequentially scan the write beam on all the segments of the OASLM 110. During projection of the write beam, only a particular segment into which the write beam is incident may be turned on and the other segment regions may be turned off. For example, referring back to FIG. 2, the first segment region S1 is turned on and the other segment regions may be turned off. At the same time, the write beam including information of the sub-CGH 11 corresponding to the first segment region S1 is projected onto the first segment region S1 through the scanning optical unit 104. Then, the second segment region S2 is turned on and the other segment regions are turned off, and at the same time, the write beam including information of the sub-CGH 11 corresponding to the second segment region S2 is projected to the second segment region S2 through the scanning optical unit 104. In this way, the write beam including the sub-CGH 11 corresponding to each segment may be sequentially projected onto the first through last segments.

Herein, the OASLM 110 may be configured to be reset at an instant of being turned on and to maintain the current state even if being turned off. That is, during projection of the write beam onto the next segment, the previous segment maintains a modulated state by the write beam corresponding thereto. For example, during projection of the write beam onto the second segment region S2, even if the first segment region S1 is turned off and the write beam is no longer incident to the first segment region S1, the first segment region S1 is not reset and maintains a state corresponding to its state when the write beam was projected thereto.

For on/off operations of the respective segments, a transparent electrode, such as Indium Tin Oxide (ITO) electrode, and an interconnection may be disposed on each segment of the OASLM 110. Differences as compared to the EASLM 102 are that a transparent electrode is disposed for each pixel in the EASLM 102, but in the OASLM 110, a transparent electrode is disposed for each segment and driving of a plurality of pixels in each segment is controlled by the incidence of the write beam. In conventional OASLMs, a plurality of vertical electrodes and a plurality of horizontal electrodes are formed on a front surface and a rear surface, respectively, such that only a segment at an intersection between voltage-applied vertical and horizontal electrodes is turned on, and the other segments are turned off. However, since one vertical electrode and one horizontal electrode contact a plurality of segments, there is a possibility that some pixels in the turned-off segment may malfunction.

In the current embodiment, to ensure an accurate operation, the respective segments of the OASLM 110 are turned on/off independently of one another. That is, according to the current embodiment, a plurality of vertical electrodes and a plurality of horizontal electrodes intersecting each other are not used, and for each segment, a separate transparent electrode and an independent interconnection electrically connected to the transparent electrode may be used. When using such an independent electrode and interconnection structure, it may be favorable to minimization of a gap between segments.

Figure 5:
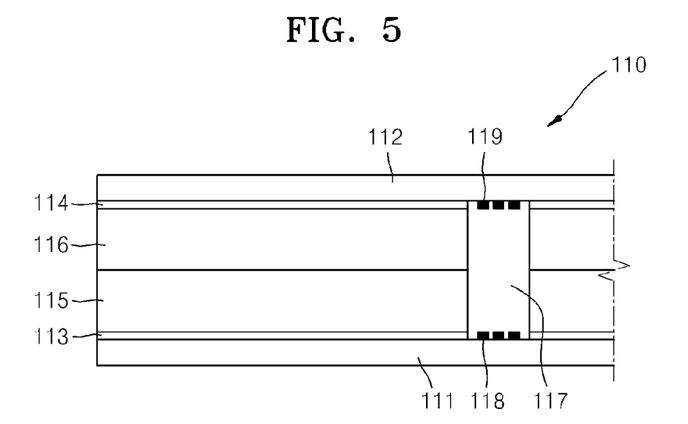
FIG. 5 is a cross-sectional view schematically showing a structure of an OASLM according to an exemplary embodiment.

For example, referring to the schematic cross-sectional view of FIG. 5, the OASLM 110 may include a front substrate 111 and a rear substrate 112 which are transparent and are disposed to face each other, a first transparent electrode 113 disposed on the upper surface of the front substrate 111, a second transparent electrode 114 disposed on the lower surface of the rear substrate 112, a photosensitive layer 115 disposed on the first transparent electrode 113, and a liquid crystal layer 116 disposed on the second transparent electrode 114. The liquid crystal layer 116 and the photosensitive layer 115 may directly contact each other, but a mirror layer (not shown) for reflecting the light may be further disposed between the liquid crystal layer 116 and the photosensitive layer 115.

In the overall structure of the holographic 3D image display apparatus 100, the photosensitive layer 115 is closer to the EASLM 102 and the liquid crystal layer 116 is closer to the Fourier lens 107. When a voltage is applied to the first transparent electrode 113 and the second transparent electrode 114, if the write beam is not incident on the photosensitive layer 115, the resistance of the photosensitive layer 115 increases, such that a voltage drop occurs over the photosensitive layer 115. Thus, the liquid crystal layer 116 is in an off state, such that arrangement of liquid crystals in the liquid crystal layer 116 is not changed. On the other hand, if the write beam is incident on the photosensitive layer 115, the resistance of the photosensitive layer 115 decreases, such that a voltage drop occurs over the liquid crystal layer 116. Then, the liquid crystal layer 116 is turned on, such that an arrangement of the liquid crystals of the liquid crystal layer 116 may be changed. According to this principle, the OASLM 110 may modulate the read beam incident to the liquid crystal layer 116.

Herein, the first transparent electrode 113, the second transparent electrode 114, the photosensitive layer 115, and the liquid crystal layer 116 may be patterned to form the plurality of segments. An insulating layer 117 may be disposed on gaps between the segments. However, only the first transparent electrode 113 and the second transparent electrode 114 may be patterned, and the photosensitive layer 115 and the liquid crystal layer 116 may be continuously formed without being separated by the insulating layer 117. The first transparent electrode 113 and the second transparent electrode 114 in a segment are completely separated from those of another segment, and are patterned in the same shape as that of the corresponding segment. In this structure, as shown in FIG. 5, a plurality of interconnections 118 and 119 for applying a voltage to the first transparent electrode 113 and the second transparent electrode 114, respectively, may be disposed on a portion of the front substrate 111 and a portion of the rear substrate 112 corresponding to a gap region, respectively. For example, the plurality of first interconnections 118 may be disposed on the front substrate 111 to be electrically connected to the first transparent electrode 113 corresponding thereto, and the plurality of second interconnections 119 may be disposed on the rear substrate 112 to be electrically connected to the second transparent electrode 114 corresponding thereto.

Figure 6:
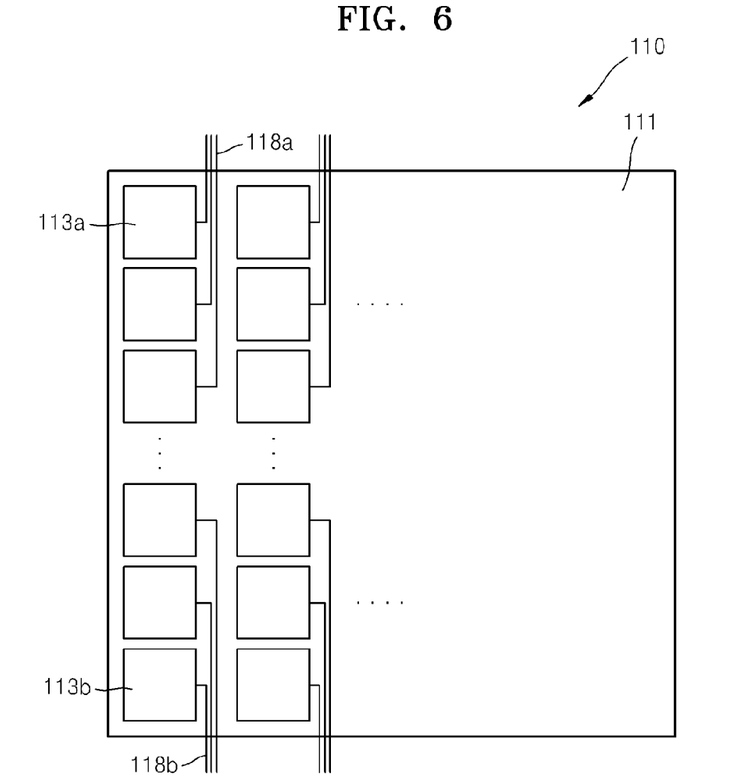
FIG. 6 is a plane view illustrating an arrangement structure of interconnections in the OASLM shown in FIG. 5.

However, for a large number of segments, as the number of interconnections 118 and 119 disposed on the gap regions increases, the gap size may also increase. FIG. 6 is a plane view showing an arrangement of the interconnections 118 and 119 for minimizing the gap size, in which only the front surface 111, the first transparent electrode 113a and 113b, and the first interconnections 118a and 118b are schematically shown. Referring to FIG. 6, a plurality of first transparent electrodes 113a and 113b are arranged in a 2D array on the front substrate 111. Arrangement of the first transparent electrodes 113a and 113b is the same as that of segments. A plurality of first interconnections 118a and 118b are arranged along gaps and are connected to the first transparent electrodes 113a and 113b corresponding thereto, respectively.

According to the current embodiment, as shown in FIG. 6, the OASLM 110 may be divided into an upper portion and a lower portion with respect to the center, and the first interconnections 118a and 118b may be disposed separately on gaps of the upper portion and gaps of the lower portion, respectively. The first interconnections 118a disposed along the gaps of the upper portion are connected only to the first transparent electrodes 113a of the upper portion, and the first interconnections 118b disposed along the gaps of the lower portion are connected only to the first transparent electrodes 113b of the lower portion. Then, the number of first interconnections 118a and 118b disposed on a gap may be reduced by half. For example, when 10 segments are arranged in a vertical direction, 5 first interconnections 118a may be disposed on the gap of the upper portion and 5 first interconnections 118b may be disposed on the gap of the lower portion, instead of disposing the 10 interconnections 118 on a gap. Although only the front substrate 111, the first transparent electrodes (113a and 113b, and the first interconnections 118a and 118b are shown in FIG. 6), the same structure may be equally applied to the rear substrate 112, the second transparent electrodes 114, and the second interconnections 119. While the OASLM 110 is divided into the upper portion and the lower portion in FIG. 6, it may also be divided into a left portion and a right portion to dispose the first interconnections 118 and 118*b* thereon, respectively. In this case, the first interconnections 118*a* and 118*b* may be disposed in a horizontal direction rather than in a vertical direction.

Figure 7:
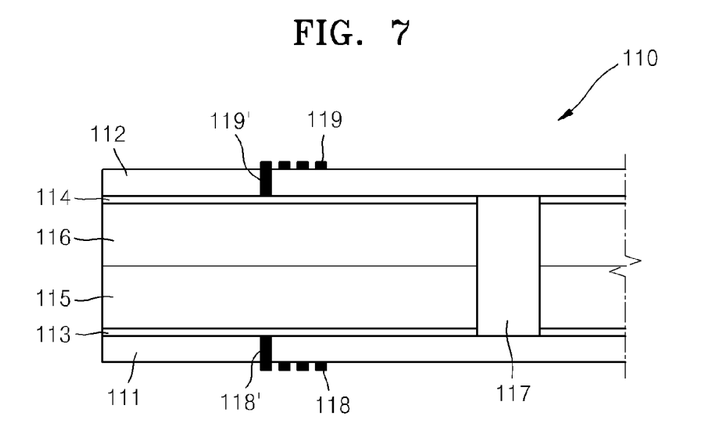
FIG. 7 is a cross-sectional view schematically showing a structure of an OASLM according to another exemplary embodiment.

As shown in the cross-sectional view of FIG. 7, the plurality of interconnections 118 and 119 may be disposed on outer surfaces of the front substrate 111 and the rear substrate 112, respectively. In this case, the interconnections 118 and 119 are not disposed in gaps, such that the gap size may be further reduced. For example, referring to FIG. 7, the plurality of first interconnections 118 are arranged along the outer surface of the front substrate 111 to face a region of the first transparent electrode 113. The plurality of first interconnections 118 may be electrically connected to the corresponding first transparent electrode 113 through a first via hole 118' passing through the front substrate 111. Likewise, the plurality of second interconnections 119 are arranged along the outer surface of the rear substrate 112 to face a region of the second transparent electrode 114, and may be electrically connected to the corresponding second transparent electrode 114 through a second via hole 119' passing through the rear substrate 112.

Figure 8:
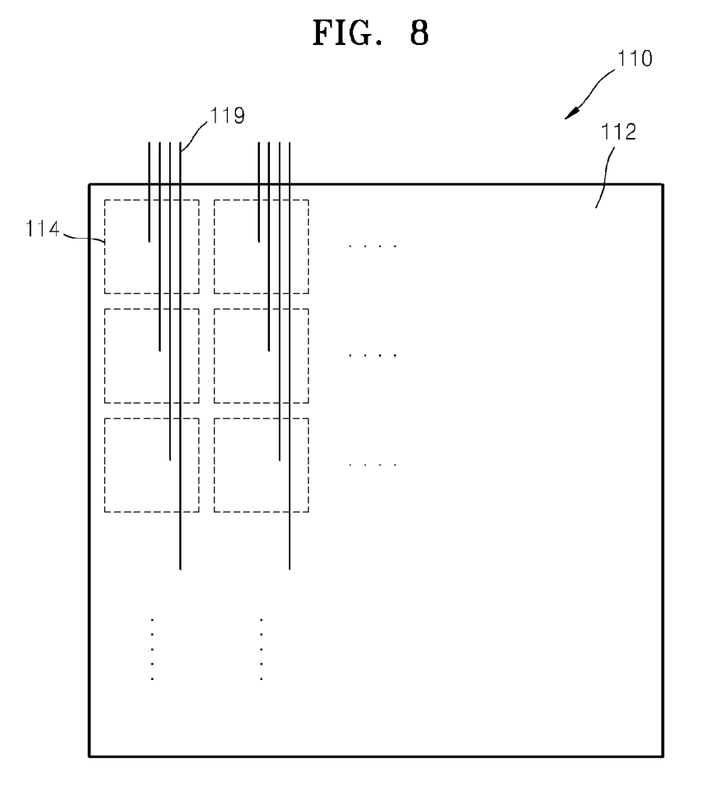
FIG. 8 is a plane view illustrating an arrangement structure of interconnections in the OASLM shown in FIG. 7.

As shown in the plane view of FIG. 8, in this case, the interconnections 118 and 119 are not disposed along the gaps, and thus, it is not necessary to dispose the interconnections 118 and 119 in a distributed manner over the upper portion and the lower portion of the OASLM 110. For convenience, only the rear substrate 112 and the second interconnections 119 are shown in FIG. 8. Referring to FIG. 8, in a direction from an upper portion to a lower portion, the plurality of second interconnections 119 may contact the corresponding second transparent electrodes 114 by passing through the rear substrate 112.

To facilitate understanding of the present disclosure, exemplary embodiments of the OASLM divided into the plurality of segments, and the holographic 3D image display apparatus and method using the OASLM have been described and shown in the accompanying drawings. However, it should be understood that such embodiments are merely intended to illustrate the present disclosure and not to limit the present disclosure. It should be also understood that the present disclosure is not limited to the illustrated and provided description. This is because various modifications may be made by those of ordinary skill in the art.

What is claimed is:

1. An optically addressable spatial light modulator (OASLM) comprising:
  a plurality of light modulation segments arranged in a two-dimensional (2D) array;
  a plurality of gaps disposed among the plurality of segments;
  a plurality of first independent transparent electrodes, wherein each of the plurality of light modulation segments comprises one of the plurality of first independent transparent electrodes in a one-to-one relationship;
  a plurality of second independent transparent electrodes, wherein each of the plurality of light modulation segments comprises one of the plurality of second independent transparent electrodes in a one-to-one relationship;
  a plurality of first independent interconnections, each of the plurality of first independent interconnections connected to one of the plurality of first independent transparent electrodes in a one-to-one relationship; and
  a plurality of second independent interconnections, each of the plurality of second independent interconnections connected to one of the plurality of second independent transparent electrodes in a one-to-one relationship, such that each of the plurality of segments can be turned on and off independently of any other of the plurality of segments.

2. The OASLM of claim 1, further comprising:
  a transparent front substrate and a transparent rear substrate; wherein the plurality of first independent transparent electrodes are disposed on a surface of the front substrate and the plurality of second independent transparent electrodes are disposed on a surface of the rear substrate; and
  a photosensitive layer disposed on the plurality of first independent transparent electrodes and a liquid crystal layer disposed on the plurality of second independent transparent electrodes.

3. The OASLM of claim 2, wherein the plurality of first independent transparent electrodes, the plurality of second independent transparent electrodes, the photosensitive layer, and the liquid crystal layer are patterned, thus forming the plurality of segments.

4. The OASLM of claim 3, wherein:
  each of the plurality of first independent interconnections is disposed on the front substrate, and
  each of the plurality of second independent interconnections is disposed on the rear substrate.

5. The OASLM of claim 4, wherein the plurality of first independent interconnections and the plurality of second independent interconnections are disposed in the gaps between the plurality of segments.

6. The OASLM of claim 5, wherein the OASLM further comprises a first half portion and a second half portion, disposed opposite the first half portion with respect to a center of the OASLM;
  wherein the plurality of first independent interconnections comprises a plurality of first independent interconnections disposed in the first half portion and a plurality of first independent interconnections disposed in the second half portion, and the plurality of second independent interconnections comprises a plurality of second independent interconnections disposed in the first half portion and a plurality of second independent interconnections disposed in the second half portion;
  wherein the plurality of first independent interconnections disposed in the first half portion and the plurality of second independent interconnections disposed in the first half portion are connected to a plurality of first independent transparent electrodes disposed in the first half portion, of the plurality of first independent transparent electrodes, and to a plurality of second independent transparent electrodes disposed in the first half portion, of the plurality of second independent transparent electrodes; and
  wherein and the plurality of first independent interconnections disposed in the second half portion and the plurality of second independent interconnections disposed in the second half portion are connected to a plurality of first independent transparent electrodes disposed in the second half portion, of the plurality of first independent transparent electrodes, and to a plurality of second independent transparent electrodes disposed in the second half portion, of the plurality of second independent transparent electrodes.

7. The OASLM of claim 3, wherein:
  the plurality of first independent interconnections are disposed along an outer surface of the front substrate, which face a region in which the plurality of first independent transparent electrodes are disposed; and the plurality of second independent interconnections are disposed along an outer surface of the rear substrate, which face a region in which the plurality of second independent transparent electrodes are disposed.

8. The OASLM of claim 7, further comprising:

a first via hole passing through the front substrate, wherein the plurality of first independent interconnections are electrically connected with the plurality of first independent transparent electrodes corresponding thereto via the first via hole; and a second via hole passing through the rear substrate, wherein the plurality of second independent interconnections are electrically connected with the plurality of second independent transparent electrodes corresponding thereto via the second via hole.

9. The OASLM of claim 1, further comprising an insulating layer disposed on the plurality of gaps.

* * * * *